(12) United States Patent
Ogata (10) Patent No.: US 6,428,416 B1
(45) Date of Patent: Aug. 6, 2002

(54) MANIPULATING DEVICE FOR AN ENTERTAINMENT SYSTEM AND AN ENTERTAINMENT SYSTEM HAVING THE SAME MANIPULATING DEVICE

(75) Inventor: Hiroki Ogata, Chiba (JP)

(73) Assignee: Sony Computer Entertainmant Inc. (JP)

( * ) Notice: Subject to any disclaimer, the term of this patent is extended or adjusted under 35 U.S.C. 154(b) by 0 days.

(21) Appl. No.: 09/697,610

(22) Filed: Oct. 26, 2000

(30) Foreign Application Priority Data

Nov. 1, 1999 (JP) .......................................... 11-311366

(51) Int. Cl.[7] .............................................. A63F 13/02
(52) U.S. Cl. ..................................... 463/37; 273/148 B
(58) Field of Search ...................... 273/148 B; 463/36, 463/37, 38, 46; 345/156, 161

(56) References Cited

U.S. PATENT DOCUMENTS

| 4,408,103 A | * | 10/1983 | Smith, III | 273/148 B X |
| 4,439,648 A | * | 3/1984 | Reiner et al. | 273/148 B X |
| 4,687,200 A | * | 8/1987 | Shirai | 273/148 B |
| 5,294,121 A | * | 3/1994 | Chiang | 273/148 B |
| 5,551,693 A | * | 9/1996 | Goto et al. | 463/37 |
| 5,716,274 A | * | 2/1998 | Goto et al. | 463/37 |
| 5,853,326 A | * | 12/1998 | Goto et al. | 463/37 |
| 5,923,317 A | | 7/1999 | Sayler et al. | |
| 6,171,191 B1 | * | 1/2001 | Ogata et al. | 463/37 |
| 6,231,444 B1 | * | 5/2001 | Goto et al. | 463/37 |

FOREIGN PATENT DOCUMENTS

| EP | 0056315 | * | 7/1982 | 273/148 B |
| EP | 0 682 350 A2 | | 11/1995 | |
| EP | 0 768 619 A1 | | 4/1997 | |
| FR | 2574588 | * | 6/1986 | 273/148 B |

* cited by examiner

Primary Examiner—Raleigh W. Chiu
(74) Attorney, Agent, or Firm—Lerner, David, Littenberg, Krumholz & Mentlik, LLP (57) ABSTRACT

A manipulating device for an entertainment system is provided which overcomes the problems that might occur when an excessive force is applied thereto and permits smooth operation. A manipulating device 1 comprises an operating portion 10 and a stopper portion 40 that supports the operating portion 10. Leg portions 41 of the stopper portion 40 opens when depressive pressure is applied to the operating portion 10, and closes and restores the operating portion 10 to its initial position when the depressive pressure is released.

11 Claims, 5 Drawing Sheets

MANIPULATING DEVICE FOR AN ENTERTAINMENT SYSTEM AND AN ENTERTAINMENT SYSTEM HAVING THE SAME MANIPULATING DEVICE

FIELD OF THE INVENTION

The present invention relates to a manipulating device that is connected to an entertainment system, such as a video game machine, television set, video tape recorder, and music player, and manipulated by an operator, and to an entertainment system having the same manipulating device.

BACKGROUND OF THE INVENTION

Generally, in an entertainment system, such as a video game machine, a manipulating device or controller that is independent of the main unit allows the human operator to enter his commands to the main unit. For the gaming machine, because there are a wide variety of commands related to its game, its manipulating device has a plurality of operation buttons. The operator controls the behavior of a game character or characters on screen or the progress of the game play by manipulating those operation buttons.

The manipulating device of this type is such that it can be manipulated while it is gripped by the hands and fingers of the operator, and a portion of the cross-shaped operating portion is exposed from its housing. The operator manipulates this operating portion to enter specific commands to the gaming machine and cause a game character(s) or the like on screen to act or move in a specific manner.

Figure 4:
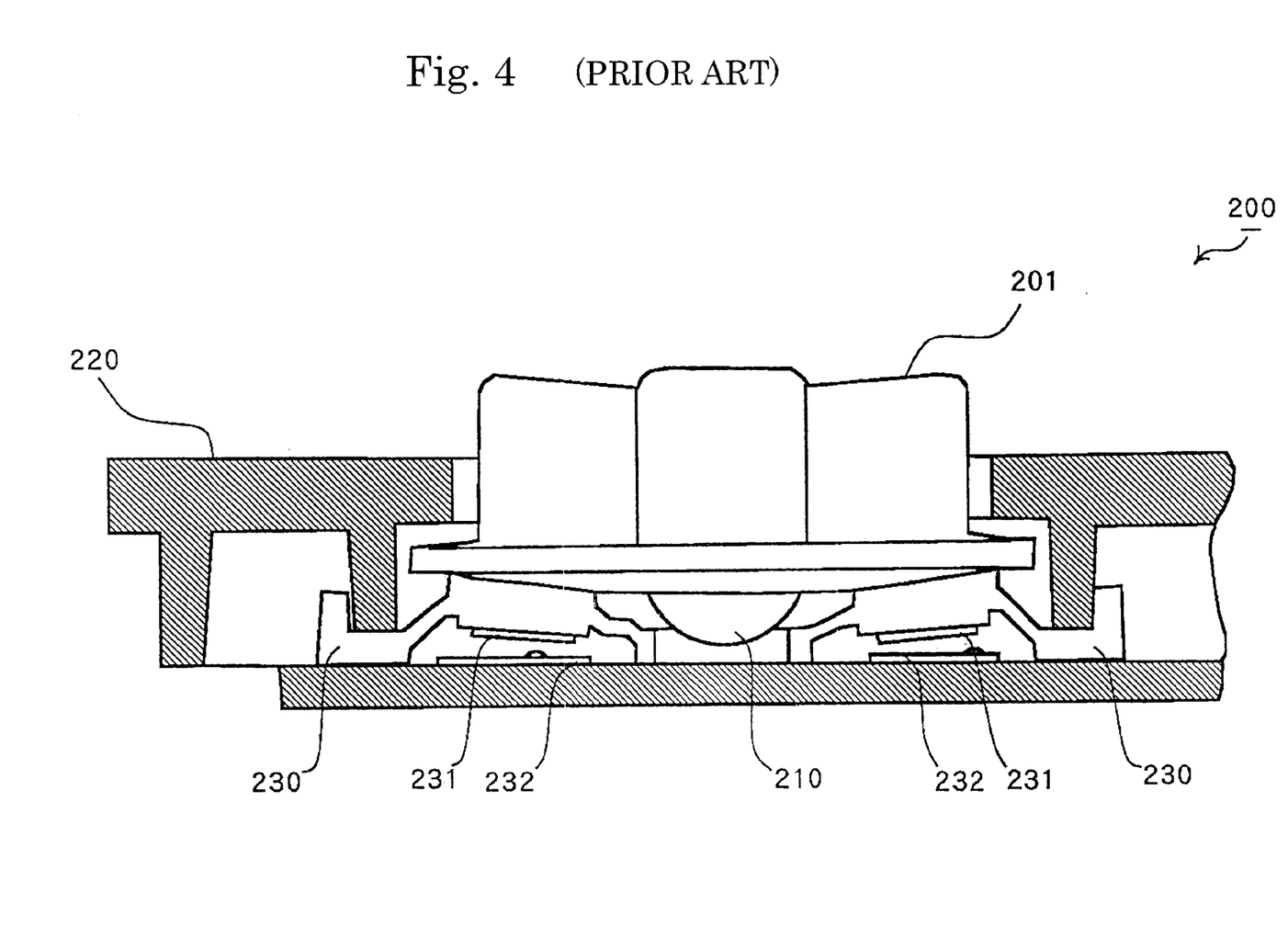
FIG. 4 is a cross-sectional view of a manipulating device according to a prior art.

A prior art manipulating device has a cross-sectional structure as shown in FIG. 4, for example. A manipulating device 200 shown has a protruding or dome portion 210 on the bottom of an operating portion 201, so that the operating portion 201 pivotally displaces at a contact with a housing 220. For the structure of such a manipulating device 200, reference may be made, for example, to Japanese Utility Model Publication No. 3-13951 (13951/1991).

When the operator depresses one end of the operating portion 201, an elastic member 230 having an electrically conductive portion 231 on which the operating portion rests is pushed down, which causes an electrode portion 232 thereunder to be shorted by the electrically conductive portion 231, and thus become electrically conductive.

However, with the manipulating device 200 of such a structure, if the operator manipulates it in an unexpected manner or moves the operating portion 201 with an unexpected force, the housing 220 or operating portion 201 may be damaged around the dome portion 210. Normally, the operating portion 201 or the like is formed of a durable material in order to prevent such damage; nonetheless, there may be cases where the operating portion 201 would become slower to return to its predetermined position.

Figure 5:
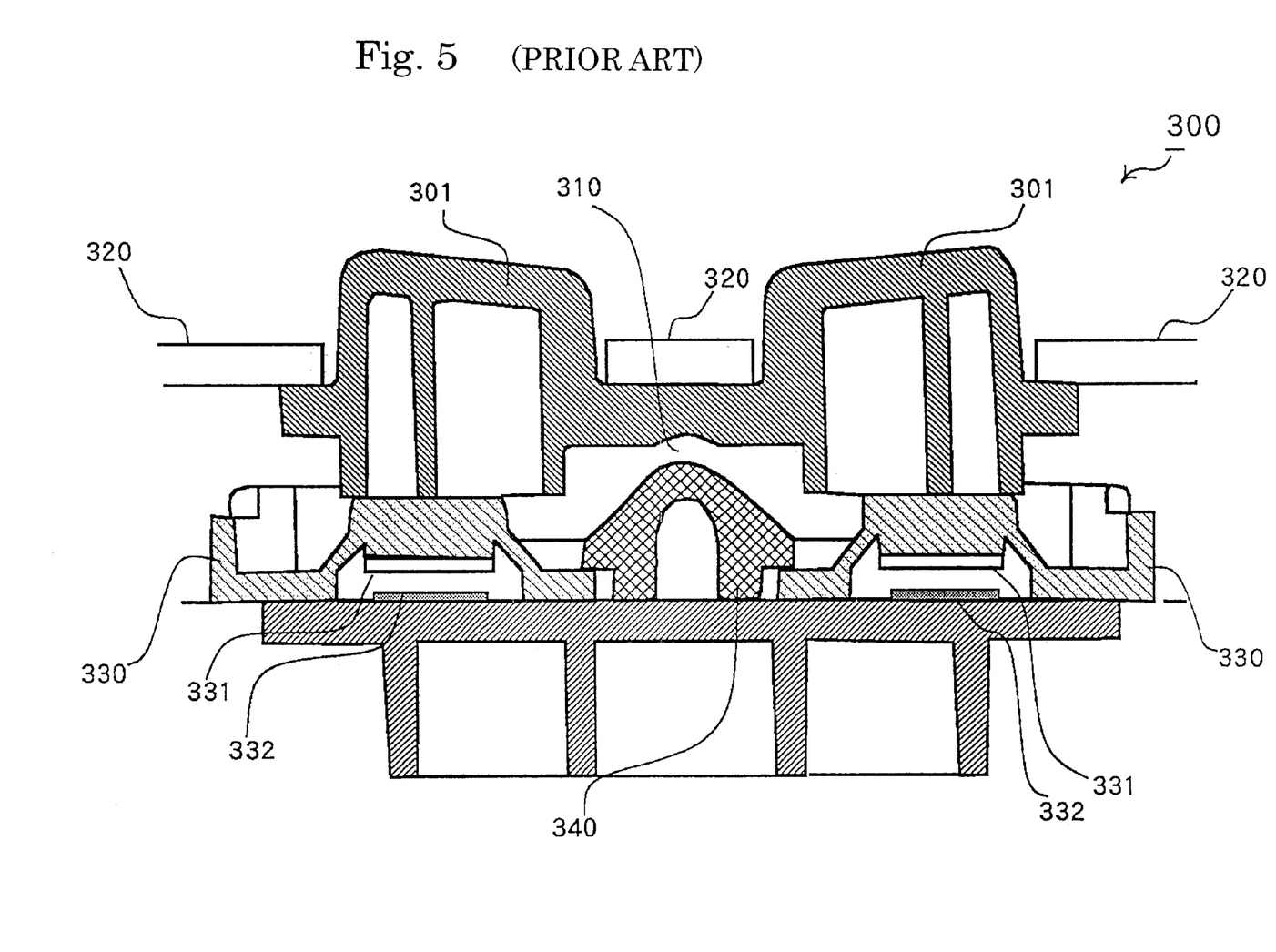
FIG. 5 is a cross-sectional view of another manipulating device according to a prior art.

In order to solve such problems, a manipulating device 300 of structure shown in FIG. 5 is proposed, as disclosed in Japanese Utility Model Laid Open No. 6-38137 (38137/1994), Japanese Patent Laid Open No. 8-24439 (24439/1996), and Japanese Patent Laid Open No. 9-326219 (326219/1997).

The manipulating device 300 has an operating portion 301 placed on an elastic member 330 having an electrically conductive portion 331, and a stopper portion 340 is disposed in the center of the elastic member 330, so that there is a small gap between a tip of the stopper portion 340 and the operating portion 301. Thus, when the operating portion 301 is depressed, it tilts as if the bottom of the operating portion 301 slides on the stopper portion 340, so that its wear and damage may be restricted. Additionally, as a dent 310 is disposed in the bottom of the operating portion 301, the tip of the stopper portion 340 may snuggly fit into the dent 310 to make it less likely for the operating portion 301 to be misaligned, so that ease and feel of operation is enhanced for the operator.

More recently, a manipulating device that permits a character or characters on screen to be controlled in an analog fashion via an analog input from the operating portion 301 (see, for example, Japanese Patent Laid Open No. 7-10252 (10252/1995) and Japanese Patent Laid Open No. 90042-11 (90042/1999)) is also available. In addition, another manipulating controller is also proposed where a pressure-sensitive element is used in the electrode portion 333 of the manipulating device 300 of FIG. 5 to permit changes in the action and movement of the on-screen character(s) in response to the pressure applied to the operating portion 301.

However, even with the manipulating device 300 of the structure shown in FIG. 5, it seems likely that the operator may apply excessive pressure to the operating portion 301. In that case, the stopper portion 340 and/or operating portion 301 may be unavoidably worn away; additionally, if the pressure-sensitive element is used in the electrode portion 332, excessive depressive pressure applied to the pressure-sensitive element may cause the characteristic of the pressure-sensitive element to be changed, resulting in subsequent problems for use of the manipulating device 300.

As a gap is provided between the stopper portion 340 and operating portion 301, the operating portion 301 hits the stopper portion 340 when the operating portion 301 is depressed, so that its movement is temporarily slowed down. In that case, the manipulation feels stepwise, which may reduce the appeal of the analog input, especially when the pressure-sensitive element is used.

Thus, the present invention has its objective to provide a manipulating device for an entertainment system that overcomes the above problems, and an entertainment system that includes the same manipulating device.

SUMMARY OF THE INVENTION

A manipulating device of the present invention comprises: an operating member that can tilt in a certain direction when depressed by an operator; and a pivotally supporting member for supporting the operating member, said operating member and said pivotally supporting member contained in a housing. The pivotally supporting member is constructed so that, when said depressive pressure is released, it pushes up said operating member to restore it to its initial state.

The pivotally supporting member may be formed so that while the depressive pressure is applied to said operating member, a force opposing said depressive pressure is applied to said operating member.

Additionally, a dent into which an end of said supporting member is fitted may be disposed in said operating member to hold said operating member in a predetermined position.

The pivotally supporting member has its tip formed, for example, in convex curved shape, while said dent is formed in concave curved shape so as to mate the convex curved shape, and it is constructed so that as said dent slides on the tip of said supporting member, said operating member tilts over said pivotally supporting member in a predetermined direction. More specifically, said operating member has a depressing portion for applying said depressive pressure; an electrically conductive portion formed corresponding to the depressing portion and opposite to a surface to which the depressive pressure is applied; and an electrode portion for making said electrically conductive portion either conductive or nonconductive depending on the tilt when the operating member is tilted by the depressive pressure applied to the depressing portion. A pressure-sensitive element, for example, is used in the electrode portion. If a pair of depressing portions are provided, said dent is placed in the middle of this pair of depressing portions. Said electrically conductive portion is disposed on a movable contact member, which isolates, by an elastic force, the electrically conductive portion and electrode portion that oppose each other; when the movable contact member corresponding to said depressing portion is depressed by tilting of said operating member, the electrode portion disposed on that movable contact member becomes conductive.

It should be appreciated that in the above manipulating device, the pivotally supporting member has leg portions provided as a structure for effectively adding a restoring force to the pivotally supporting member. When depressing pressure is applied via said operating member, the leg portions open, while generating a resilient force that opposes said depressive pressure; when the depressive pressure is no longer applied, the restoring force that attempts to close the opened leg portions pushes up said operating member back to its initial position. If the pivotally supporting member is placed on a substrate, said leg portions are disposed so as to open in a groove provided in said substrate.

BEST MODE FOR IMPLEMENTING THE INVENTION

An embodiment of the present invention is described below where the present invention is applied to a manipulating device of a video game machine, an example of an entertainment system.

Figure 1:
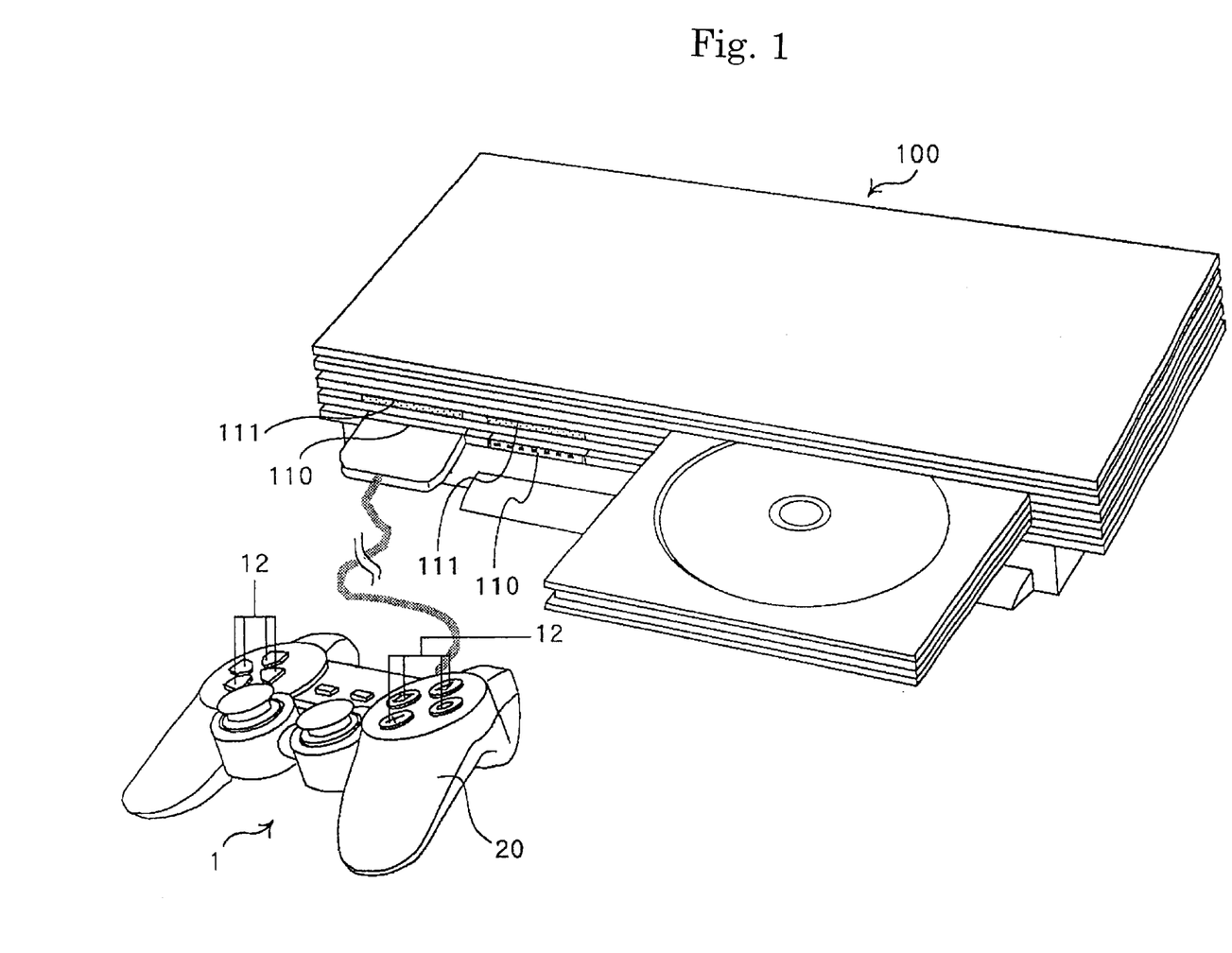
FIG. 1 is a schematic view illustrating how a manipulating device of the present invention is used.

FIG. 1 shows how a manipulating device 1 of the present embodiment is used. The manipulating device 1 of the present invention is detachably connected to a connector portion 110 of a video game machine 100. A plurality of connector portions 110 are provided, so that the manipulating device 1 may be connected to any of them. Additionally, the content of the game play based on the operation via the manipulating device 1 may be stored in a memory (not shown) that is attached into a memory slot 111 corresponding to the manipulating device 1. The video game machine 100 is connected to a display apparatus (not shown), so that the operator can visually check the operation performed via the manipulating device 1.

The video game machine 100 includes the capability of reading a computer game program from a storage medium where that program is stored and displaying a character or characters on the display apparatus by executing that program, as well as various control functions. A signal form the manipulating device 1 is also processed by one of the control functions contained within the video game machine 100, so that its content is reflected by the movement and/or action of a character or characters on the display apparatus.

To the manipulating device 1 are assigned functions or so forth for moving a character or characters displayed on the display apparatus up/down/right/left, for example, although they depend on the content of a computer game program.

Next, the structure of the manipulating device 1 is described in greater detail.

Figure 2:
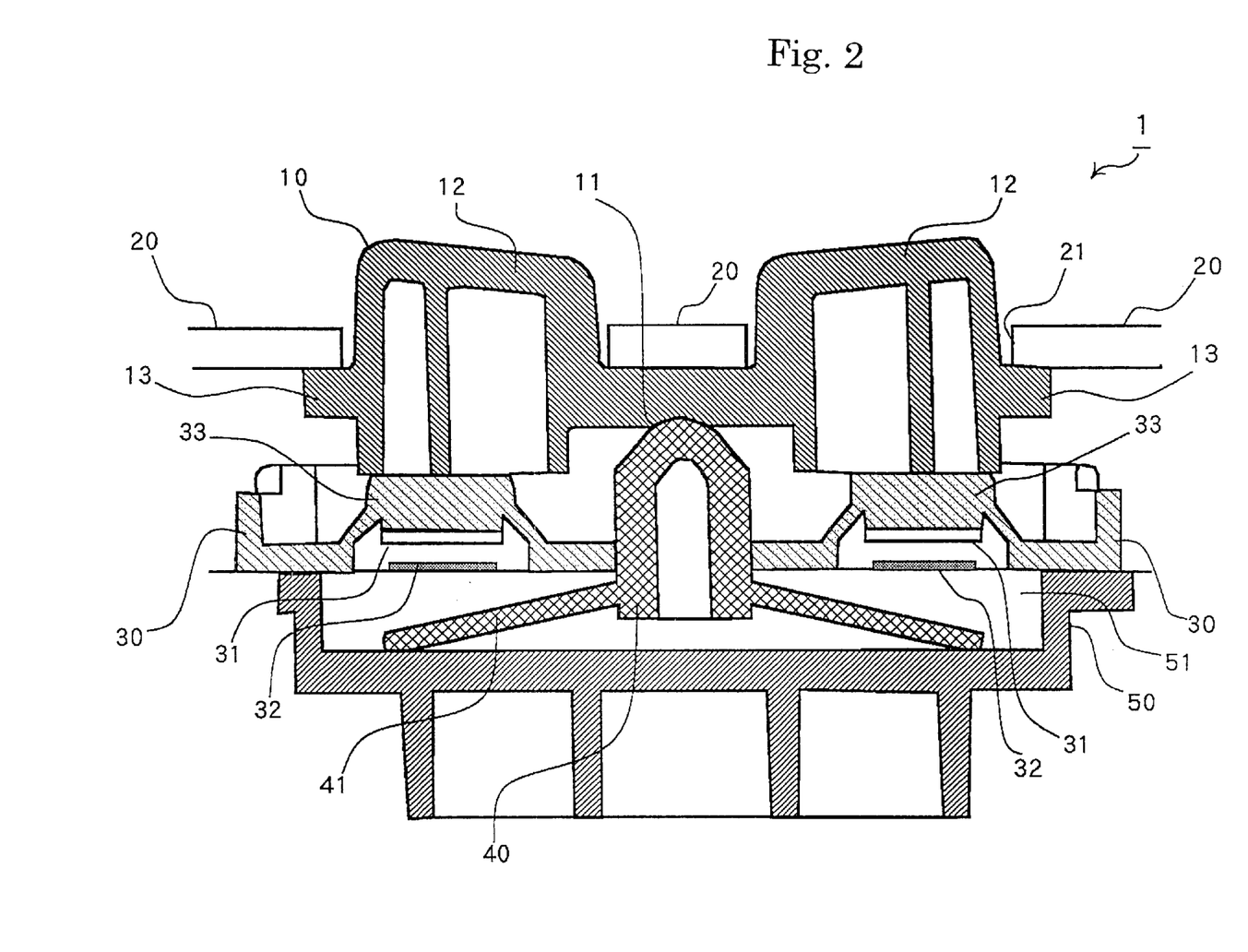
FIG. 2 is a cross-sectional view of a manipulating device according to an embodiment of the invention.
Figure 3:
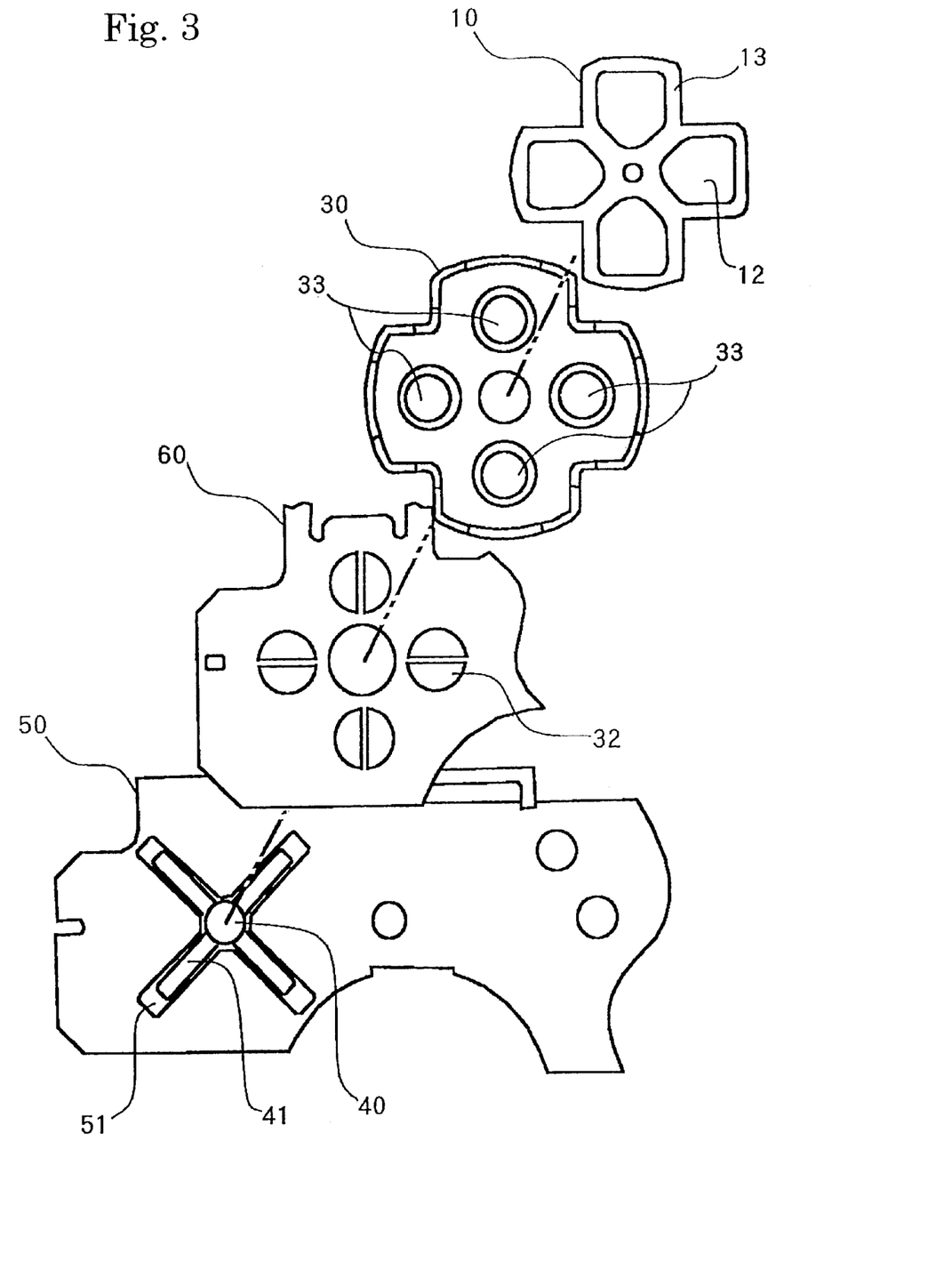
FIG. 3 is an exploded view illustrating components within a housing of the manipulating device according to the embodiment of the invention.

The structure of the manipulating device 1 is as shown in the cross-sectional view of FIG. 2 and the exploded view of FIG. 3.

Specifically, an operating portion 10, a housing 20, an elastic member 30, a stopper portion 40, and a plate 50 are assembled in their predetermined positions to form the manipulating device 1.

The housing 20 is of portable type, and contains the operating portion 10, elastic member 30, stopper portion 40, and plate 50 therein. The operator may manipulate the operating portion 10 and so forth, while grasping this housing 20 by his hands and fingers.

A hole 21 for the operating portion is formed in the housing 20, so that a portion of the operating portion 10, that is, a portion of a cross-shaped key having depressing portions 12, is exposed through this hole 21 for the operating portion. The operating portion 10 has a peripheral flange portion 13 formed around it. The flange portion 13 is stopped at the open end of the operating portion 10, thereby preventing the operating portion 10 from being detached from the housing 20. By tilting this cross-shaped key in any direction, the operator applies a depressive pressure within the housing 20, thereby inputting a certain command to the video game machine 100. It should be appreciated that the operating portion 10 is not limited to 360-degree operation as effected by the cross-shaped key, but two-way operation may also be applicable.

The elastic member 30 is formed of a resilient or flexible material, such as rubber. The elastic member 30 has a movable contact portion 33 formed so as to protrude toward and corresponding to the depressing portion 12, and the operating section 10 rests on this movable contact portion 33. The movable contact portion 33 has a electrically conductive portion 31 opposite to a face on which the operating portion 10 rests.

When the depressing portion 12 is depressed by the operator, the movable contact portion 33 elastically deforms, so that the electrically conductive portion 31 disposed on the movable contact portion 33 is pushed down toward the opposing electrode portion 32. This causes the electrically conductive portion 31 corresponding to the depressing portion 12 depressed to come into contact with the electrode portion 32, thereby making the electrode portion 32 conductive.

The electrode portion 32 has a pressure-sensitive capability. More specifically, it has a pressure-sensitive element that may be formed of pressure-sensitive conductive rubber, so that the value of electrical resistance in the electrode portion 32 changes according to the magnitude of pressure exerted on the pressure-sensitive element. Generally, the pressure-sensitive element formed of pressure-sensitive conductive rubber exhibits the smallest resistance value when no pressure is applied, while its resistance value increases in proportion to the pressure exerted. Thus, the electrode portion 32 outputs the largest signal (voltage) when no pressure is exerted, while the output signal decreases in an analog fashion as the applied pressure increases.

The movable contact portion 33 is designed to return to its original position when the pressure exerted on the depressing portion 12 is released.

It should be appreciated that the elastic member 30 may be formed integrally with the operating portion 10.

The stopper portion 40 functions as a pivotal support when the operating portion 10 is manipulated. A tip of the stopper portion 40 is always in contact with the bottom of the operating portion 10. In the present embodiment, the tip of the stopper portion 40 is of dome or convex structure, while a dent 11 of concave shape is disposed in the bottom of the operating portion 10 so that it matches the dome.

The stopper 40 has leg portions 41. The leg portions 41 open when depressive pressure is applied by the operating portion 10, and, when the depressive pressure is released, act to restore the operating portion 10 to its initial state, or push it up back to its original position, due to its self-restoring force that attempts to close the leg portion.

More specifically, when depressive pressure is applied to the depressing portion 12, the operating portion 10 is pushed down, where the resulting resilient or repelling force of the leg portions 41 causes the operating portion 10 to move down smoothly. Thus, even when the operator exerts an excessive force to the depressing portion 12, the situation that may cause changes, such as wear and damage, to other members of the manipulating device 1 can be avoided, while smooth and accurate movement (fine adjustment) of the operating portion 10 can be achieved.

On the plate 50 are placed the elastic member 30, stopper portion 40, and so forth, and the electrode portion 32 having the afore-described pressure-sensitive capability is arranged in place corresponding to the movable contact portion 33. Circuitry (electronic circuitry) including this electrode portion 32 may be provided on a sheet-like sheet member 60 and then placed on the plate 50. The plate 50 has a groove 51, where the ends of the leg portions 41 are fitted therein. The groove 51 serves to prevent misalignment of the stopper portion 40. The electrode 32 becomes conductive as it is brought into contact with the electrically conductive portion 31, thereby closing the circuit.

Next, how to operate the manipulating device 1 is described. When any of the depressing portions 12 (cross-shaped key) exposed from the housing 20 is depressed by the operator, the movable contact 33 of the elastic member 30 corresponding to that depressing portion 12 bows downward against the elastic force of the elastic member 30, and the operating portion 10, as a whole, also bows downward against the resilient force of the leg portions 41 of the stopper portion 40. At that moment, the leg portions 41 open in the groove 51.

Because the dent 11 is in contact with the stopper portion 40, when any of the depressing portions 12 is depressed, the operating portion 10 tilts toward the depressed portion, as pivotally supported by that contact point or a contact point between the flange 13 and housing 20. Then, the protruding movable contact portion 33 is pushed down, bringing the electrically conductive portion 31 attached at the bottom of the movable contact portion 33 into contact with the electrode portion 32 to make the electrode portion 32 conductive. This causes a predetermined circuit to close, thereby sending a signal to the video game machine 100.

When neighboring depressing portions 12 are depressed simultaneously, two adjacent electrodes 32 become conductive, so that a signal indicative of that state is sent to the video game machine 100. In that case, an action or movement in a diagonal direction, for example, is performed on the display apparatus.

In the present embodiment, the electrode portion 32 is shorted by the electrically conductive portion 31, although any signal may be generated as the electrically conductive portion 31 is brought into contact with the electrode portion 32 or any signal may be stopped.

The convex or dome portion at the tip of the stopper portion 40 and the dent or concave portion 11 should preferably be mated with some play. Especially, if the dome portion at the tip of the stopper portion 40 assumes a convex spherical or curved surface and the dent portion 11 assumes a concave spherical or curved surface having a curvature (R) slightly greater than that of the dome portion, then the operating portion 10 and stopper portion 40 are nearly in point contact with each other, so that the operating portion 10 may be actuated smoothly. Thus, the feel of operation when the depressing portion 12 is depressed may be enhanced, while conveniently absorbing manufacturing tolerances.

When the depressive pressure is no longer applied to the depressing portion 12, the leg portions 41 close due to the elastic force of the movable contact portion 33 and the resilient force of the legs 41, so that the operating portion 10 returns to its predetermined position. At that moment, the electrically conductive portion 31 and electrode portion 32 are removed from each other, so that the circuit is opened. As a result, the video game machine 100 recognizes that the depressive pressure applied to the depressing portion 12 is released.

When a force is applied equally to each of the depressing portions 12 directly above the operating portion 10, the operating portion 10 moves down without tilting; in this case, it bows downward to the extent that the leg portions 41 of the stopper portion 40 are fully opened. Thus, the length of the legs, its inclination angle with no pressure applied, and so forth may be adjusted so that the movable contact portions 33 that are not adjacent to each other do not become simultaneously conductive as the operating portion is moved down.

The electrode portion 32 has the pressure-sensitive capability to detect the pressure; however, because the depressive pressure is restricted by the resilient force of the stopper portion 40 as described above, potential damage resulting from an excessive depressive force can be prevented. Furthermore, the resilient force of the stopper 40 acts appropriately to make manipulation of a character or characters on the display apparatus smoother and enable operation in an analog fashion, thereby adding a greater sense of involvement to the game play.

It should be appreciated that in the present embodiment, the video game machine 100 and manipulating device 1 are detachable, although the manipulating device 1 may be integrally built into a display-equipped game machine, such as hand-held gaming device.

The present invention is not limited to manipulating devices or controllers of video game machines as in the present embodiment, but may be applicable to manipulating devices or controllers used to manipulate television sets, video tape recorders, music players, and so forth, and also to manipulating devices or controllers for use with all-in-one entertainment systems.

Although the present embodiment has been described and illustrated above, it is, of course, understood that the manipulating device of the present invention is by way of example only and various modifications and improvements can be made by those of skill in the art without departing from the scope of the present invention.

What is claimed is:

1. A manipulating device for an entertainment system, comprising:

a housing;

an operating member assembled in said housing, said operating member having a rest position and being tiltable in certain directions when depressive pressure is applied to said operating member; and a supporting member in said housing for pivotally supporting said operating member;

wherein, when said depressive pressure is released from said operating member, said supporting member pushes said operating member to restore it to said rest position.

2. The manipulating device according to claim 1, wherein said supporting member includes a resilient member adapted to exert a biasing force opposed to said depressive pressure, whereby, when said depressive pressure is applied to said operating member, said resilient member exerts said biasing force on said operating member.

3. The manipulating device according to claim 1, wherein said supporting member has a free end and said operating member has a dent for receiving said free end of said supporting member to hold said operating member in a predetermined position.

4. The manipulating device according to claim 3, wherein said free end of said supporting member is formed in the shape of a convex curved surface, and said dent is formed in the shape of a concave curved surface so as to mate with said convex curved surface, whereby said operating member tilts over said supporting member in said certain directions as said dent slides on said free end of said supporting member.

5. The manipulating device according to claim 4, wherein said housing includes a plurality of electrodes; and said operating member has a plurality of depressing portions on one surface for applying said depressive pressure, and a plurality of electrically conductive portions formed on a surface opposite said one surface, each of said electrically conductive portions being in correspondence with one of said depressing portions and being spaced from an opposed one of said electrodes in said rest position of said operating member and being movable into contact with said opposed one of said electrodes upon application of said depressive pressure to said corresponding depressing portion.

6. The manipulating device according to claim 5, wherein said electrodes are pressure-sensitive elements.

7. The manipulating device according to claim 6, wherein said depressing portions include at least one pair of depressing portions, and said dent is located between said at least one pair of depressing portions.

8. The manipulating device according to claim 5, wherein each of said electrically conductive portions is disposed on a movable contact member, said movable contact member biasing said electrically conductive portion in a direction away from said opposed one of said electrodes, wherein when said movable contact member corresponding to said depressing portion is depressed by tilting said operating member, said electrode becomes conductive.

9. The manipulating device according to claim 1, wherein said supporting member includes resilient leg portions, said leg portions being moved away from one another when said depressive pressure is applied to said operating member, and when said depressive pressure is released from said operating portion, said leg portions being biased toward one another, whereby movement of said leg portions toward one another pushes said operating portion to said rest position.

10. The manipulating device according to claim 9, wherein said housing includes a substrate having a recessed groove, said supporting member being positioned on said substrate so that said leg portions are disposed in said recessed groove.

11. An entertainment system, comprising:

a processing unit; and a manipulating device for sending a signal to said processing unit, said manipulating device including a housing, an operating member assembled in said housing, said operating member having a rest position and being tiltable in certain directions when depressive pressure is applied to said operating member, and a supporting member in said housing for pivotally supporting said operating member, wherein, when said depressive pressure is released from said operating member, said supporting member pushes said operating member to restore it to said rest position.

* * * * *

UNITED STATES PATENT AND TRADEMARK OFFICE
CERTIFICATE OF CORRECTION

PATENT NO. : 6,428,416 B1
DATED : August 6, 2002
INVENTOR(S) : Hiroki Ogata It is certified that error appears in the above-identified patent and that said Letters Patent is hereby corrected as shown below:

The Title page and specification should be deleted and replaced with the attached title page and specification.

Signed and Sealed this

Twenty-first Day of March, 2006

JON W. DUDAS
*Director of the United States Patent and Trademark Office*

(12) United States Patent
Ogata (10) Patent No.: US 6,428,416 B1
(45) Date of Patent: Aug. 6, 2002

(54) MANIPULATING DEVICE FOR AN ENTERTAINMENT SYSTEM AND AN ENTERTAINMENT SYSTEM HAVING THE SAME MANIPULATING DEVICE

(75) Inventor: Hiroki Ogata, Chiba (JP)

(73) Assignee: Sony Computer Entertainment Inc. (JP)

( * ) Notice: Subject to any disclaimer, the term of this patent is extended or adjusted under 35 U.S.C. 154(b) by 0 days.

(21) Appl. No.: 09/697,610

(22) Filed: Oct. 26, 2000

(30) Foreign Application Priority Data

Nov. 1, 1999 (JP) .............................. 11-311366

(51) Int. Cl.[7] ................................................ A63F 13/02
(52) U.S. Cl. ...................................... 463/37; 273/148 B
(58) Field of Search ...................... 273/148 B; 463/36, 463/37, 38, 46; 345/156, 161

(56) References Cited

U.S. PATENT DOCUMENTS

| 4,408,103 | A | * | 10/1983 | Smith, III | 273/148 B X |
| 4,439,648 | A | * | 3/1984 | Reiner et al. | 273/148 B X |
| 4,687,200 | A | * | 8/1987 | Shirai | 273/148 B |
| 5,294,121 | A | * | 3/1994 | Chiang | 273/148 B |
| 5,551,693 | A | * | 9/1996 | Goto et al. | 463/37 |
| 5,716,274 | A | * | 2/1998 | Goto et al. | 463/37 |
| 5,853,326 | A | * | 12/1998 | Goto et al. | 463/37 |
| 5,923,317 | A | | 7/1999 | Sayler et al. | |
| 6,171,191 | B1 | * | 1/2001 | Ogata et al. | 463/37 |
| 6,231,444 | B1 | * | 5/2001 | Goto et al. | 463/37 |

FOREIGN PATENT DOCUMENTS

| EP | 0056315 | * | 7/1982 | 273/148 B |
| EP | 0 682 350 A2 | | 11/1995 | |
| EP | 0 768 619 A1 | | 4/1997 | |
| FR | 2574588 | * | 6/1986 | 273/148 B |

* cited by examiner

*Primary Examiner*—Raleigh W. Chiu
(74) *Attorney, Agent, or Firm*—Lerner, David, Littenberg, Krumholz & Mentlik, LLP (57) ABSTRACT

A manipulating device for an entertainment system permits smooth operation and overcomes the problems that might occur when an excessive force is applied thereto. The manipulating device includes an operating portion and a stopper portion that supports the operating portion. Leg portions of the stopper portion spread apart when depressive pressure is applied to the operating portion, and move toward one another to restore the operating portion to its initial position when the depressive pressure is released.

11 Claims, 5 Drawing Sheets

MANIPULATING DEVICE FOR AN ENTERTAINMENT SYSTEM AND AN ENTERTAINMENT SYSTEM HAVING THE SAME MANIPULATING DEVICE

BACKGROUND OF THE INVENTION

The present invention relates to a manipulating device that is connected to an entertainment system, such as a video game machine, television set, video tape recorder, and music player, and manipulated by an operator, and to an entertainment system having the same manipulating device.

Generally, in an entertainment system, such as a video game machine, a manipulating device or controller that is independent of the main unit allows the human operator to enter his commands to the main unit. For the gaming machine, because there are a wide variety of commands related to its game, its manipulating device has a plurality of operation buttons. The operator controls the behavior of a game character or characters on a screen or the progress of the game play by manipulating those operation buttons.

The manipulating device of this type is such that it can be manipulated while it is gripped by the hands and fingers of the operator, and a portion of the cross-shaped operating portion is exposed from its housing. The operator manipulates this operating portion to enter specific commands to the gaming machine and cause a game character(s) or the like on the screen to act or move in a specific manner.

A prior art manipulating device has a cross-sectional structure as shown in FIG. 4, for example. The manipulating device 200 shown has a protruding or dome portion 210 on the bottom of an operating portion 201, so that the operating portion 201 may be pivotally displaced where it contacts housing 220. For the structure of such a manipulating device 200, reference may be made, for example, to Japanese Utility Model Publication No. 3-13951 (13951/1991).

When the operator depresses one end of the operating portion 201, an elastic member 230 having an electrically conductive portion 231 on which the operating portion rests is pushed down, which causes an electrode portion 232 thereunder to be shorted by the electrically conductive portion 231, and thus become electrically conductive.

However, with the manipulating device 200 of such a structure, if the operator manipulates it in an unexpected manner or moves the operating portion 201 with an unexpected force, the housing 220 or operating portion 201 may be damaged around the dome portion 210. Normally, the operating portion 201 or the like is formed of a durable material in order to prevent such damage; nonetheless, there may be cases where the operating portion 201 would become slower to return to its predetermined position.

In order to solve such problems, a manipulating device 300 of the structure shown in FIG. 5 has been proposed, as disclosed in Japanese Utility Model Laid Open No. 6-38137 (38137/1994), Japanese Patent Laid Open No. 8-24439 (24439/1996), and Japanese Patent Laid Open No. 9-326219 (326219/1997).

The manipulating device 300 has an operating portion 301 placed on an elastic member 330 having an electrically conductive portion 331, and a stopper portion 340 is disposed in the center of the elastic member 330, so that there is a small gap between a tip of the stopper portion 340 and the operating portion 301. Thus, when the operating portion 301 is depressed, it tilts as if the bottom of the operating portion 301 is sliding on the stopper portion 340, so that its wear and damage may be restricted. Additionally, as a dent 310 is disposed in the bottom of the operating portion 301, the tip of the stopper portion 340 may snuggly fit into the dent 310 to make it less likely for the operating portion 301 to be misaligned, so that ease and feel of operation is enhanced for the operator.

More recently, a manipulating device that permits a character or characters on the screen to be controlled in an analog fashion via an analog input from the operating portion 301 (see, for example, Japanese Patent Laid Open No. 7-10252 (10252/1995) and Japanese Patent Laid Open No. 90042-11 (90042/1999)) has also become available. In addition, another manipulating controller has also been proposed where a pressure-sensitive element is used in the electrode portion 332 of the manipulating device 300 of FIG. 5 to permit changes in the action and movement of the on-screen character(s) in response to the pressure applied to the operating portion 301.

However, even with the manipulating device 300 having the structure shown in FIG. 5, it seems likely that the operator may apply excessive pressure to the operating portion 301. In that case, the stopper portion 340 and/or operating portion 301 may be unavoidably worn away; additionally, if the pressure-sensitive element is used in the electrode portion 332, excessive depressive pressure applied to the pressure-sensitive element may cause the characteristic of the pressure-sensitive element to be changed, resulting in subsequent problems for use of the manipulating device 300.

As a gap is provided between the stopper portion 340 and operating portion 301, the operating portion 301 hits the stopper portion 340 when the operating portion 301 is depressed, so that its movement is temporarily slowed down. In that case, the manipulation feels stepwise, which may reduce the appeal of the analog input, especially when the pressure-sensitive element is used.

Thus, the present invention has as its objective to provide a manipulating device for an entertainment system that overcomes the above problems, and an entertainment system that includes the same manipulating device.

SUMMARY OF THE INVENTION

A manipulating device of the present invention includes a housing; an operating member assembled in the housing, the operating member having a rest position and being tiltable in certain directions when depressive pressure is applied to the operating member; and a supporting member in the housing for pivotally supporting the operating member. The supporting member is constructed so that, when the depressive pressure is released from the operating member, the supporting member pushes said operating member to restore it to the rest position.

The supporting member may include a resilient member adapted to exert a biasing force opposed to the depressive pressure, whereby when the depressive pressure is applied to the operating member, the resilient member exerts the biasing force on said operating member.

Additionally, the supporting member may have a free end and the operating member may have a dent for receiving the free end of the supporting member to hold the operating member in a predetermined position.

The free end of the supporting member may be formed, for example, in a convex curved shape, while the dent is formed in a concave curved shape so as to mate with the convex curved shape, whereby as the dent slides on the free end of the supporting member, the operating member tilts over the supporting member in the certain directions. More specifically, the housing includes a plurality of electrodes; and the operating member has a plurality of depressing portions on one surface for applying the depressive pressure, and a plurality of electrically conductive portions formed on a surface opposite the one surface, each of the electrically conductive portions being in correspondence with one of the depressing portions and being spaced from an opposed one of the electrodes in the rest position of the operating member and being movable into contact with the opposed one of the electrodes upon application of the depressive pressure to the corresponding depressing portion. A pressure-sensitive element, for example, may be used in the electrodes. If a pair of depressing portions are provided, the dent may be located between this pair of depressing portions. Each of the electrically conductive portions may be disposed on a movable contact member which biases the electrically conductive portion in a direction away from the opposed one of the electrodes, wherein when the movable contact member corresponding to the depressing portion is depressed by tilting the operating member, the electrode disposed on that movable contact member becomes conductive.

It should be appreciated that in the above manipulating device, the supporting member may have resilient leg portions provided as a structure for effectively adding a restoring force to the supporting member. When the depressive pressure is applied to the operating member, the leg portions move away from one another, while generating a resilient force that opposes the depressive pressure; and when the depressive pressure is no longer applied, the leg portions are biased toward one another, whereby movement of the leg portions toward one another pushes up the operating member back to the rest position. If the pivotally supporting member is placed on a substrate, said leg portions are disposed so as to open in a groove provided in said substrate.

BRIEF DESCRIPTION OF THE DRAWINGS

FIG. 1 is a schematic view illustrating how a manipulating device of the present invention is used.

FIG. 2 is a cross-sectional view of a manipulating device according to an embodiment of the invention.

FIG. 3 is an exploded view illustrating components within a housing of the manipulating device according to the embodiment of the invention.

FIG. 4 is a cross-sectional view of a manipulating device according to the prior art.

FIG. 5 is a cross-sectional view of another manipulating device according to the prior art.

DETAILED DESCRIPTION

An embodiment of the present invention is described below where the present invention is applied to a manipulating device of a video game machine, an example of an entertainment system.

FIG. 1 shows how a manipulating device 1 of the present embodiment is used. The manipulating device 1 of the present invention is detachably connected to a connector portion 110 of a video game machine 100. A plurality of connector portions 110 are provided, so that the manipulating device 1 may be connected to any of them. Additionally, the content of the game play based on the operation via the manipulating device 1 may be stored in a memory (not shown) that is attached into a memory slot 111 corresponding to the manipulating device 1. The video game machine 100 is connected to a display apparatus (not shown), so that the operator can visually check the operation performed via the manipulating device 1.

The video game machine 100 includes the capability of reading a computer game program from a storage medium in which the program is stored and displaying a character or characters on the display apparatus by executing the program, as well as various control functions. A signal from the manipulating device 1 is also processed by one of the control functions contained within the video game machine 100, so that its content is reflected by the movement and/or action of a character or characters on the display apparatus.

To the manipulating device 1 is assigned functions or so forth for moving a character or characters displayed on the display apparatus up/down/right/left, for example, although the movements depend on the content of the computer game program.

Next, the structure of the manipulating device 1 is described in greater detail.

The structure of the manipulating device 1 is as shown in the cross-sectional view of FIG. 2 and the exploded view of FIG. 3.

Specifically, an operating portion 10, a housing 20, an elastic member 30, a stopper portion 40, and a plate 50 are assembled in their predetermined positions to form the manipulating device 1.

The housing 20 is of portable type, and contains the operating portion 10, elastic member 30, stopper portion 40, and plate 50 therein.

The operator may manipulate the operating portion 10 and so forth, while grasping this housing 20 by his hands and fingers.

A hole 21 for the operating portion is formed in the housing 20, so that a portion of the operating portion 10, that is, a portion of a cross-shaped key having depressing portions 12, is exposed through this hole 21. The operating portion 10 has a peripheral flange portion 13 formed around it. The flange portion 13 is stopped at the open end of the operating portion 10, thereby preventing the operating portion 10 from being detached from the housing 20. By tilting this cross-shaped key in any direction, the operator applies a depressive pressure within the housing 20, thereby inputting a certain command to the video game machine 100. It should be appreciated that the operating portion 10 is not limited to 360-degree operation as effected by the cross-shaped key, but two-way operation may also be applicable.

The elastic member 30 is formed of a resilient or flexible material, such as rubber. The elastic member 30 has a movable contact portion 33 formed so as to protrude toward and corresponding to the depressing portion 12, and the operating portion 10 rests on this movable contact portion 33. The movable contact portion 33 has a electrically conductive portion 31 opposite to a face on which the operating portion 10 rests.

When the depressing portion 12 is depressed by the operator, the movable contact portion 33 elastically deforms, so that the electrically conductive portion 31 disposed on the movable contact portion 33 is pushed down toward the opposing electrode portion 32. This causes the electrically conductive portion 31 corresponding to the depressing portion 12 depressed to come into contact with the electrode portion 32, thereby making the electrode portion 32 conductive.

The electrode portion 32 has a pressure-sensitive capability. More specifically, it has a pressure-sensitive element that may be formed of pressure-sensitive conductive rubber, so that the value of electrical resistance in the electrode portion 32 changes according to the magnitude of pressure exerted on the pressure-sensitive element. Generally, the pressure-sensitive element formed of pressure-sensitive conductive rubber exhibits the smallest resistance value when no pressure is applied, while its resistance value increases in proportion to the pressure exerted. Thus, the electrode portion 32 outputs the largest signal (voltage) when no pressure is exerted, while the output signal decreases in an analog fashion as the applied pressure increases.

The movable contact portion 33 is designed to return to its original position when the pressure exerted on the depressing portion 12 is released.

It should be appreciated that the elastic member 30 may be formed integrally with the operating portion 10.

The stopper portion 40 functions as a pivotal support when the operating portion 10 is manipulated. A tip of the stopper portion 40 is always in contact with the bottom of the operating portion 10. In the present embodiment, the tip of the stopper portion 40 is of dome or convex structure, while a dent 11 of concave shape is disposed in the bottom of the operating portion 10 so that it matches the dome.

The stopper 40 has leg portions 41. The leg portions 41 spread apart when depressive pressure is applied by the operating portion 10, and, when the depressive pressure is released, act to restore the operating portion 10 to its initial state, or push it back up to its original position, due to its self-restoring force that attempts to close the leg portions.

More specifically, when depressive pressure is applied to the depressing portion 12, the operating portion 10 is pushed down, where the resulting resilient or repelling force of the leg portions 41 causes the operating portion 10 to move down smoothly. Thus, even when the operator exerts an excessive force to the depressing portion 12, the situation that may cause permanent changes, such as wear and damage, to other members of the manipulating device 1 can be avoided, while smooth and accurate movement (fine adjustment) of the operating portion 10 can be achieved.

On the plate 50 are placed the elastic member 30, stopper portion 40, and so forth, and the electrode portion 32 having the afore-described pressure-sensitive capability is arranged in place corresponding to the movable contact portion 33. Circuitry (electronic circuitry) including this electrode portion 32 may be provided on a sheet-like member 60 and then placed on the plate 50. The plate 50 has a groove 51, where the ends of the leg portions 41 are fitted therein. The groove 51 serves to prevent misalignment of the stopper portion 40. The electrode 32 becomes conductive as the electrically conductive portion 31 is brought into contact with it, thereby closing the circuit.

Next, how to operate the manipulating device 1 is described. When any of the depressing portions 12 (of the cross-shaped operating portion 10) protruding from the housing 20 is depressed by the operator, the movable contact 33 of the elastic member 30 corresponding to that depressing portion 12 moves downward against the elastic force of the elastic member 30, and the operating portion 10, as a whole, also moves downward against the resilient force of the leg portions 41 of the stopper portion 40. At that moment, the leg portions 41 spread apart in the groove 51.

Because the dent 11 is in contact with the stopper portion. 40, when any of the depressing portions 12 is depressed, the operating portion 10 tilts toward the depressed portion, as pivotally supported by that contact point or a contact point between the flange 13 and housing 20. Then, the protruding movable contact portion 33 is pushed down, bringing the electrically conductive portion 31 attached at the bottom of the movable contact portion 33 into contact with the electrode portion 32 to make the electrode portion 32 conductive. This causes a predetermined circuit to close, thereby sending a signal to the video game machine 100.

When neighboring depressing portions 12 are depressed simultaneously, two adjacent electrodes 32 become conductive, so that a signal indicative of that state is sent to the video game machine 100.

In that case, an action or movement in a diagonal direction, for example, is performed on the display apparatus.

In the present embodiment, the electrode portion 32 is shorted by the electrically conductive portion 31, although any signal may be generated as the electrically conductive portion 31 is brought into contact with the electrode portion 32 or any signal may be stopped.

The convex or dome portion at the tip of the stopper portion 40 and the dent or concave portion 11 should preferably be mated with some play. Especially, if the dome portion at the tip of the stopper portion 40 assumes a convex spherical or curved surface and the dent portion 11 assumes a concave spherical or curved surface having a curvature (R) slightly greater than that of the dome portion, then the operating portion 10 and stopper portion 40 are nearly in point contact with each other, so that the operating portion 10 may be actuated smoothly. Thus, the feel of operation when the depressing portion 12 is depressed may be enhanced, while conveniently absorbing manufacturing tolerances.

When the depressive pressure is no longer applied to the depressing portion 12, the leg portions 41 close due to the elastic force of the movable contact portion 33 and the resilient force of the legs 41, so that the operating portion 10 returns to its predetermined position. At that moment, the electrically conductive portion 31 and electrode portion 32 are removed from each other, so that the circuit is opened. As a result, the video game machine 100 recognizes that the depressive pressure applied to the depressing portion 12 has been released.

When a force is applied equally to each of the depressing portions 12 directly above the operating portion 10, the operating portion 10 moves down without tilting; in this case, it moves downward to the extent that the leg portions 41 of the stopper portion 40 are fully spread apart. Thus, the length of the legs, their inclination angle with no pressure applied, and so forth may be adjusted so that the movable contact portions 33 that are not adjacent to each other do not become simultaneously conductive as the operating portion is moved down.

The electrode portion 32 has the pressure-sensitive capability to detect the pressure; however, because the depressive pressure is restricted by the resilient force of the stopper portion 40 as described above, potential damage resulting from an excessive depressive force can be prevented. Furthermore, the resilient force of the stopper 40 acts appropriately to make manipulation of a character or characters on the display apparatus smoother and enable operation in an analog fashion, thereby adding a greater sense of involvement to the game play.

It should be appreciated that in the present embodiment, the video game machine 100 and manipulating device 1 are detachable, although the manipulating device 1 may be integrally built into a display-equipped game machine, such as hand-held gaming device.

The present invention is not limited to manipulating devices or controllers of video game machines as in the present embodiment, but may be applicable to manipulating devices or controllers used to manipulate television sets, video tape recorders, music players, and so forth, and also to manipulating devices or controllers for use with all-in-one entertainment systems.

Although the present embodiment has been described and illustrated above, it is, of course, understood that the manipulating device of the present invention is by way of example only and various modifications and improvements can be made by those of skill in the art without departing from the scope of the present invention.

What is claimed is:

1. A manipulating device for an entertainment system, comprising:

a housing;

an operating member assembled in said housing, said operating member having a rest position and being tiltable in certain directions when depressive pressure is applied to said operating member; and a supporting member in said housing for pivotally supporting said operating member;

wherein, when said depressive pressure is released from said operating member, said supporting member pushes said operating member to restore it to said rest position.

2. The manipulating device according to claim 1, wherein said supporting member includes a resilient member adapted to exert a biasing force opposed to said depressive pressure, whereby when said depressive pressure is applied to said operating member, said resilient member exerts said biasing force on said operating member.

3. The manipulating device according to claim 1, wherein said supporting member has a free end and said operating member has a dent for receiving said free end of said supporting member to hold said operating member in a predetermined position.

4. The manipulating device according to claim 3, wherein said free end of said supporting member is formed in the shape of a convex curved surface, and said dent is formed in the shape of a concave curved surface so as to mate with said convex curved surface, whereby said operating member tilts over said supporting member in said certain directions as said dent slides on said free end of said supporting member.

5. The manipulating device according to claim 4, wherein said housing includes a plurality of electrodes; and said operating member has a plurality of depressing portions on one surface for applying said depressive pressure, and a plurality of electrically conductive portions formed on a surface opposite said one surface, each of said electrically conductive portions being in correspondence with one of said depressing portions and being spaced from an opposed one of said electrodes in said rest position of said operating member and being movable into contact with said opposed one of said electrodes upon application of said depressive pressure to said corresponding depressing portion.

6. The manipulating device according to claim 5, wherein said electrodes are pressure-sensitive elements.

7. The manipulating device according to claim 6, wherein said depressing portions include at least one pair of depressing portions, and said dent is located between said at least one pair of depressing portions.

8. The manipulating device according to claim 5, wherein each of said electrically conductive portions is disposed on a movable contact member, said movable contact member biasing said electrically conductive portion in a direction away from said opposed one of said electrodes, wherein when said movable contact member corresponding to said depressing portion is depressed by tilting said operating member, said electrode becomes conductive.

9. The manipulating device according to claim 1, wherein said supporting member includes resilient leg portions, said leg portions being moved away from one another when said depressive pressure is applied to said operating member, and when said depressive pressure is released from said operating portion, said leg portions being biased toward one another, whereby movement of said leg portions toward one another pushes said operating portion to said rest position.

10. The manipulating device according to claim 9, wherein said housing includes a substrate having a recessed groove, said supporting member being positioned on said substrate so that said leg portions are disposed in said recessed groove.

11. An entertainment system, comprising:

a processing unit; and a manipulating device for sending a signal to said processing unit, said manipulating device including a housing, an operating member assembled in said housing, said operating member having a rest position and being tiltable in certain directions when depressive pressure is applied to said operating member, and a supporting member in said housing for pivotally supporting said operating member, wherein, when said depressive pressure is released from said operating member, said supporting member pushes said operating member to restore it to said rest position.

* * * * *